(12) United States Patent
Narayanan et al.

(10) Patent No.: US 9,984,403 B2
(45) Date of Patent: May 29, 2018

(54) ELECTRONIC SHOPPING CART PROCESSING SYSTEM AND METHOD

(71) Applicant: Wal-Mart Stores, Inc., Bentonville, AR (US)

(72) Inventors: Hemanth Kumar Narayanan, Bangalore (IN); Pravat Ranjan Rana, Bangalore (IN); Bhaavan Merchant, Bangalore (IN); Aastha Garg, Ghaziabad (IN)

(73) Assignee: WAL-MART STORES, INC., Bentonville, AR (US)

( * ) Notice: Subject to any disclaimer, the term of this patent is extended or adjusted under 35 U.S.C. 154(b) by 364 days.

(21) Appl. No.: 14/528,230

(22) Filed: Oct. 30, 2014

(65) Prior Publication Data

US 2016/0125504 A1 May 5, 2016

(51) Int. Cl.
*G06F 3/048* (2013.01)
*G06Q 30/06* (2012.01)
*G06F 3/0484* (2013.01)
*G06F 3/0485* (2013.01)

(52) U.S. Cl.
CPC ....... *G06Q 30/0633* (2013.01); *G06F 3/0485* (2013.01); *G06F 3/04842* (2013.01); *G06F 3/04847* (2013.01)

(58) Field of Classification Search
CPC .................. G06Q 30/0603; G06Q 30/0633
USPC ............... 715/776, 784; 705/26.1, 27.1, 27.2
See application file for complete search history.

(56) References Cited

U.S. PATENT DOCUMENTS

| | | |
|---|---|---|
| 9,244,917 B1 | 1/2016 | Sharma |
| 2002/0111870 A1 | 8/2002 | Chinnappan |
| 2008/0235594 A1 | 9/2008 | Bhumkar |
| 2009/0043674 A1* | 2/2009 | Minsky ............. G06Q 30/0603 705/26.8 |
| 2010/0106590 A1* | 4/2010 | Fuzell-Casey ......... G06Q 30/02 705/14.25 |
| 2010/0214237 A1 | 8/2010 | Echeverri |
| 2011/0265036 A1 | 10/2011 | Hoehne |
| 2013/0063373 A1 | 3/2013 | Roh |
| 2013/0204419 A1 | 8/2013 | Pettersson |
| 2014/0279037 A1 | 9/2014 | Zimmerman |

* cited by examiner

*Primary Examiner* — Andrey Belousov
(74) *Attorney, Agent, or Firm* — Bryan Cave Leighton Paisner LLP

(57) ABSTRACT

An electronic shopping cart of a user is presented in a first interface during checkout, such as one allowing scrolling through representations of items in a shopping list in a first direction. On selection of an item, a second interface is displayed of a "shelf" for the selected item, the shelf including related items such as might be located on a same shelf as the selected result in a retail location. The second interface may allow scrolling in a second direction perpendicular to the first direction. Items in the second interface may be selected and either added to the electronic shopping cart or used to replace the selected item.

20 Claims, 6 Drawing Sheets

ELECTRONIC SHOPPING CART PROCESSING SYSTEM AND METHOD

FIELD OF THE INVENTION

This invention relates to systems and methods for conducting electronic transactions.

BACKGROUND OF THE INVENTION

Online retailers constantly strive to provide customers with the exact products they need. In a conventional approach, a user submits a query and the query is evaluated by a search engine with respect to attributes of products in a database to identify products having a high likelihood of relevance. Search engines are very sophisticated and often do provide good search results. However, invariably the user is required to sift through various pages of results in order to find a desired item. Eventually a user may selected a product and decide to check out. However, it is difficult for a retailer to know if the user has actually found precisely the desired product or is compromising.

The systems and methods described herein provide an improved approach for ensuring that customers purchase a product that closely matches the customer's needs.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
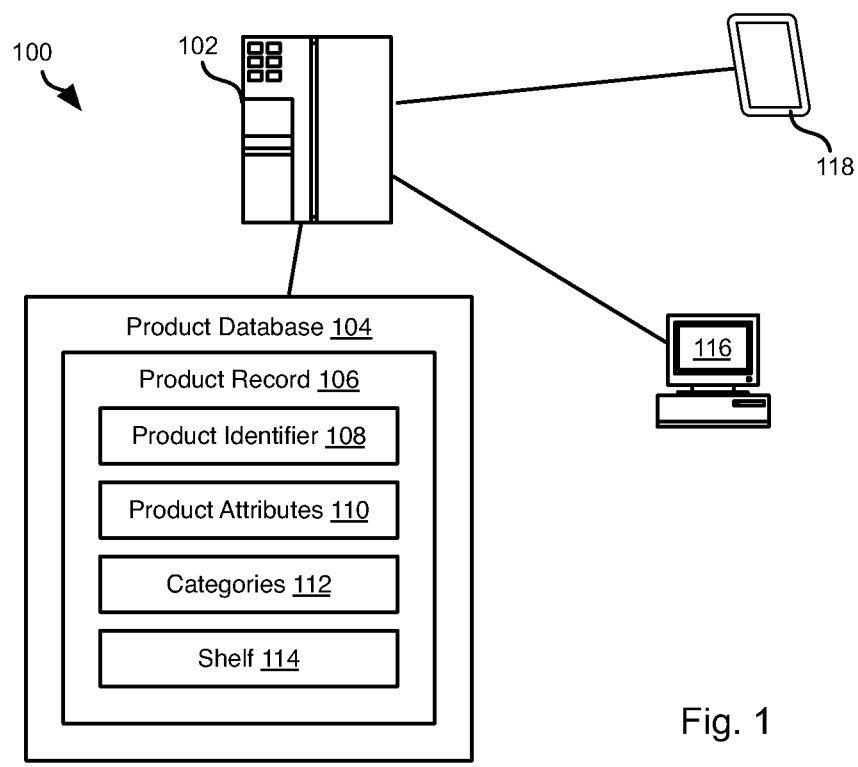
FIG. 1 is a schematic block diagram of a network environment suitable for implementing methods in accordance with embodiments of the invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods. In particular, an electronic shopping cart of a user is presented in a first interface during checkout, such as one allowing scrolling through representations of items in a shopping list in a first direction. On selection of an item, a second interface is displayed of a "shelf" for the selected item, the shelf including related items such as might be located on a same shelf as the selected result in a retail location. The second interface may allow scrolling in a second direction perpendicular to the first direction. Items in the second interface may be selected and either added to the electronic shopping cart or used to replace the selected item.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 illustrates a network environment 100 in which the systems and methods disclosed herein may be implemented. For example, a server system 102 may host product database 104 that stores product records 106 for a plurality of products. Each product record 106 may store one or more identifiers 108 of a product represented by the product record and may map a symbol or code (e.g. a universal product code UPC) to the product. The product record 108 may include a textual name of the corresponding product, e.g. a product name as printed on the product or packaging of the product.

Each product record 106 may include one or more product attributes 110. Attributes may include various <attribute> and <value> pairs, where <attribute> is a label describing the attribute and <value> is the value for the attribute, e.g. <color>-><red>, <volume>-><24 oz.>, or the like.

Each product record 106 may include one or more categories 112 associated therewith. For example, categories 112 may be a path to the product record 106 in a hierarchical taxonomy, e.g. a path of the form <department>/<category>/<sub-category>/<sub-category>.

Each product record 106 may further include a "shelf" 114. In some embodiments, a shelf is defined as product records 106 that belong to the lowest sub-category (or second lowest, third lowest, or some other of sub-category) in the categories 112 of the each product record 106 (i.e. most specific or further from root node of a hierarchical taxonomy). Alternatively, the shelf 114 may include product records 106 having attributes 110 that are identical to the each product record 106 but for certain attributes, such as brand, size, flavor, or some other sub set of the attributes 110 of the each product record.

The server system 102 may be accessed by user devices in data communication therewith by means of a network such as the Internet, a local area network (LAN), wide area network (WAN), or some other wired or wireless connection. User devices may include a desktop or laptop computer 116 or a mobile device 118, such as a smart phone, tablet computer, wearable computer, or some other mobile device.

Figure 2:
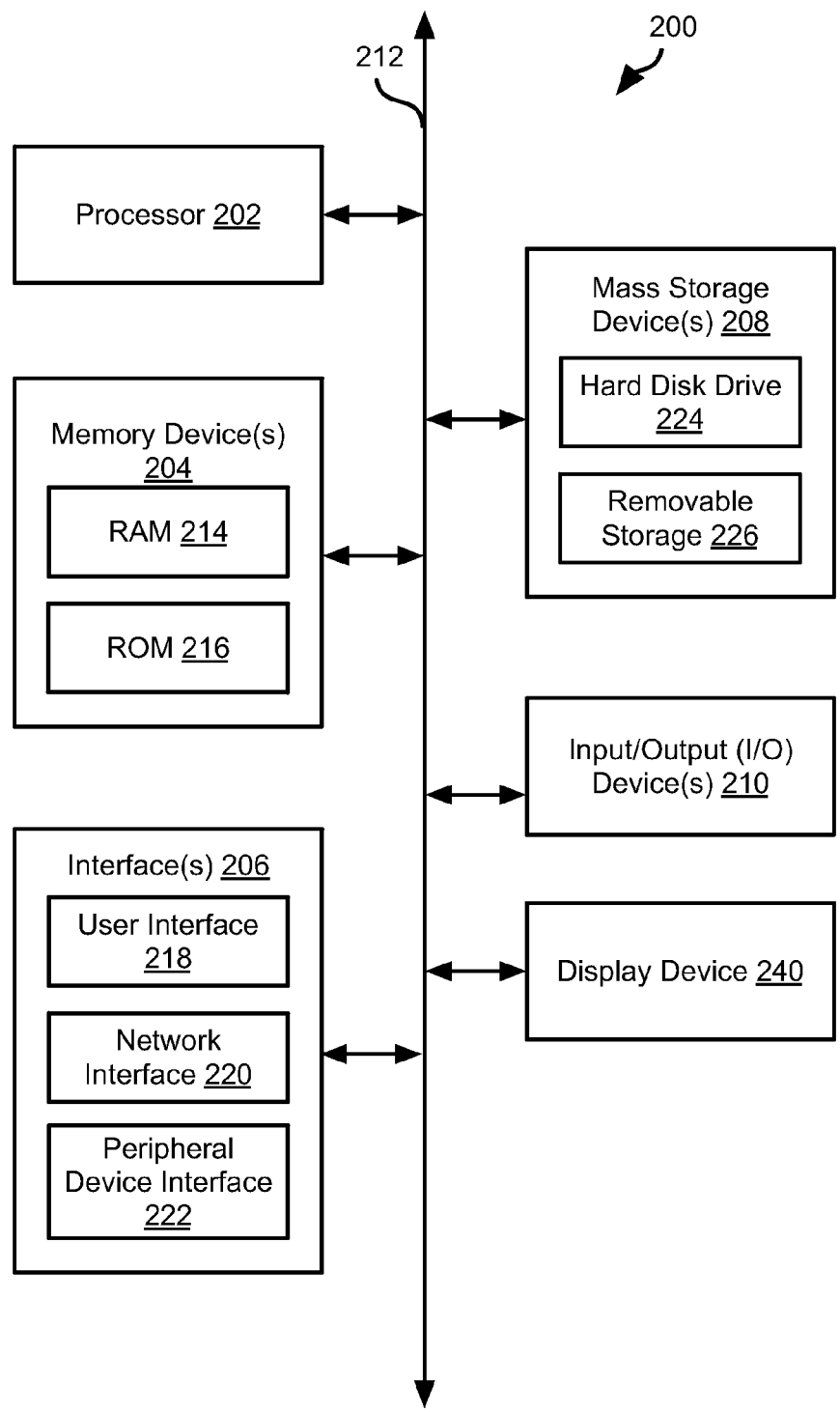
FIG. 2 is a schematic block diagram of a computer system suitable for implementing methods in accordance with embodiments of the present invention.

FIG. 2 is a block diagram illustrating an example computing device 200. Computing device 200 may be used to perform various procedures, such as those discussed herein. Computing device 200 can function as a server, a client, or any other computing entity, including any of the server system 102, computer 116, or mobile device 118. Computing device can perform various monitoring functions as discussed herein, and can execute one or more application programs, such as the application programs described herein. Computing device 200 can be any of a wide variety of computing devices, such as a desktop computer, a notebook computer, a server computer, a handheld computer, tablet computer and the like.

Computing device 200 includes one or more processor(s) 202, one or more memory device(s) 204, one or more interface(s) 206, one or more mass storage device(s) 208, one or more Input/Output (I/O) device(s) 210, a display device 230, and a camera 232 all of which are coupled to a bus 212. Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in FIG. 2, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include cursor control devices, keyboards, keypads, microphones, monitors or other display devices, speakers, printers, network interface cards, modems, lenses, CCDs or other image capture devices, and the like.

Display device 230 includes any type of device capable of displaying information to one or more users of computing device 200. Examples of display device 230 include a monitor, display terminal, video projection device, and the like.

Interface(s) 206 include various interfaces that allow computing device 200 to interact with other systems, devices, or computing environments. Example interface(s) 206 include any number of different network interfaces 220, such as interfaces to local area networks (LANs), wide area networks (WANs), wireless networks, and the Internet. Other interface(s) include user interface 218 and peripheral device interface 222. The interface(s) 206 may also include one or more user interface elements 218. The interface(s) 206 may also include one or more peripheral interfaces such as interfaces for printers, pointing devices (mice, track pad, etc.), keyboards, and the like.

Bus 212 allows processor(s) 202, memory device(s) 204, interface(s) 206, mass storage device(s) 208, and I/O device(s) 210 to communicate with one another, as well as other devices or components coupled to bus 212. Bus 212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Figure 3:
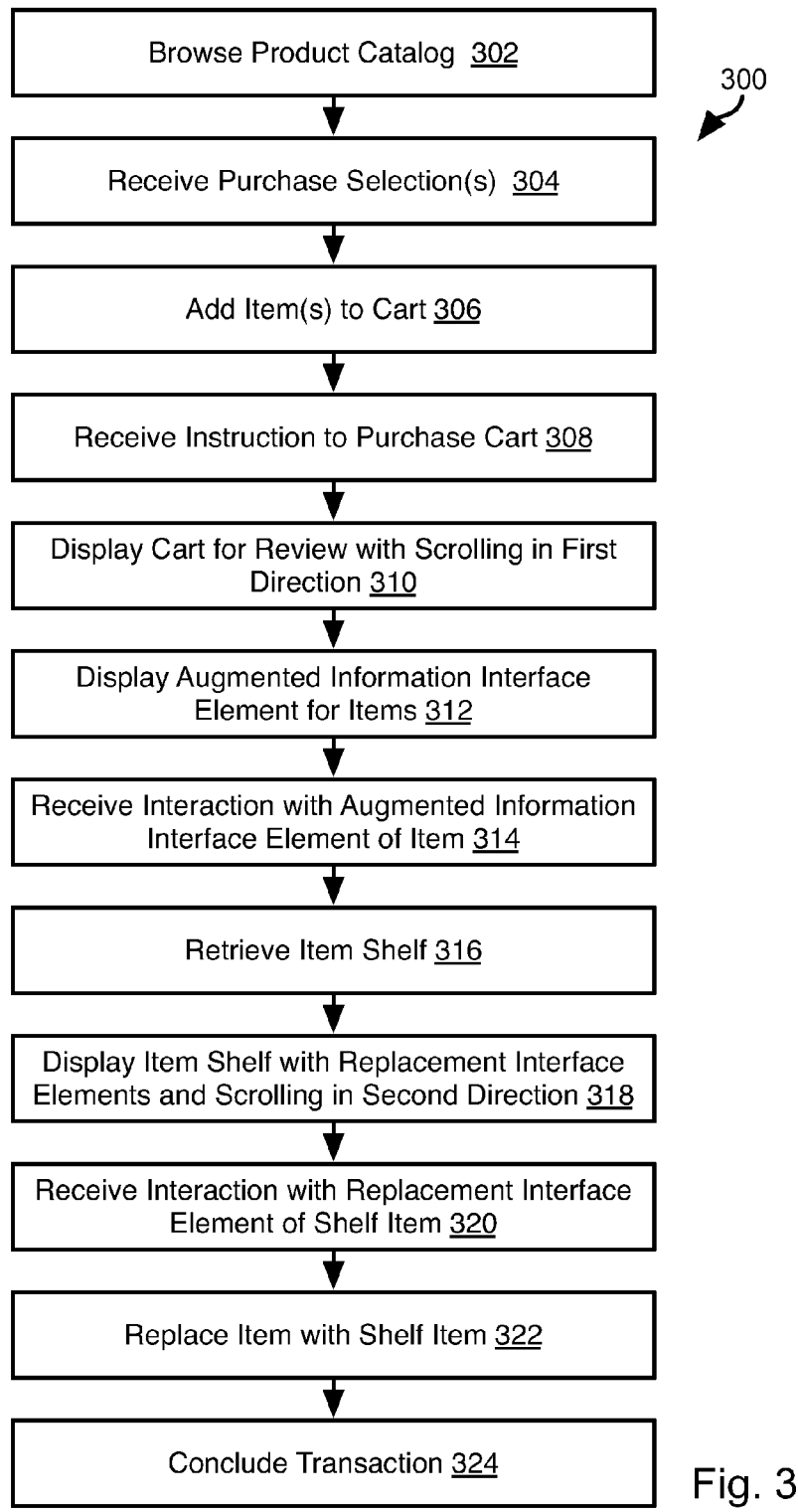
FIG. 3 is a process flow diagram of a method for providing search results in accordance with an embodiment of the present invention.

FIG. 3 illustrates a method 300 that may be executed by a computer system such as the server system 102, or a user device 116, 118, or distributed between the server system 102 and a user device 116, 118.

The method 300 may include performing browsing 302 a product catalog between the user device 116, 118 and the server system 102. This may include any interaction between the server system 102, including receiving requests for products in the form of queries or selections of links to product records from the user device 116, 118 and transmitting responses to queries and webpages associated with selected links from the server system 102. Any other exchange of requests for information and responses to requests for information in order to enable the user device 116, 118 to search and navigate the product database 104 may be performed as part of the browsing 302.

The method 300 may include receiving 304 selections of one or more purchase selections and adding 306 the purchase selections to an electronic shopping cart. For example, in an interface displayed on the user device 116, 118 a user may click a link, such as an "add to cart" link in a webpage containing information for the product record of a product in order to add the product, i.e. a reference to the product record, to an electronic shopping cart according to conventional methods known in the art. The purchase selections as received in this manner may be transmitted by the user device 116, 118 to the server system 102.

The method 300 may further include receiving 308 on the user device 116, 118 an instruction to purchase an electronic shopping cart and transmitting this instruction to the server system. For example, a user may select a "check out now" link on a website or other user interface element invoking the process of check out for items added to an electronic shopping cart.

The method 300 may include displaying 310 to the user on the user device 116, 118 representations of the product records of product records added to the electronic shopping cart. Displaying 310 the electronic shopping cart may include transmitting an interface definition to the user device, i.e. computer instructions and data sufficient to instruct the user device to render an interface for displaying and interacting with representations of product records associated with the electronic shopping cart. For example, the interface may be a web page such as an HTML (hypertext markup language) document or some other document. Alternatively, the interface may include content formatted for rendering in an application of a merchant executing on the user device. The interface may define methods and data for displaying representations of a portion of the product records of a shopping cart and receiving and executing instructions to scroll through the representations and receive and process selections of a representation. The interface may define a scrolling direction in a first direction with respect to a display device. For example, the first direction may be the vertical direction.

Displaying of the interface may include displaying 312 an augmented information interface element 312 for each of the items for which representations are presented on the display of the user device 116, 118. The method 300 may further include receiving 314 in the interface a selection of a representation of a product in the electronic shopping cart as presented in the interface, such as a selection of the augmented information interface element. In response to determining the interaction to have occurred at step 314, the selection steps 316 and 318 may be executed. In particular, the method 300 may include retrieving 316 the shelf 114 for the product record referenced by the selected representation. In particular, the product records referenced in the shelf 114 for the product record may be retrieved 316, i.e. some or all of the data contained in these product records such as the identifier and additional information such as an image and price.

The items of the shelf may be transmitted to the user device for display, i.e. as instructions for rendering a second interface including representations of the product records of the shelf and including interface elements for receiving and executing instructions to scroll through the representations of the product records of the shelf. The second interface may further include instructions for receiving and processing selection of a representation in the second interface. In some embodiments, the second interface defines a scrolling direction that is perpendicular to the first direction, e.g. in the horizontal direction. The second interface may then be displayed 318 on the user device 116, 118 and any scrolling or selecting instructions received and processed. As illustrated in FIGS. 4B and 4C, the second interface may be superimposed on the first interface. Scrolling in the second interface may be performed in a second direction perpendicular to the first direction, e.g. the horizontal direction.

The method 300 may further include receiving 320 interaction with a replacement interface element of a representation of a product record of the shelf in the second interface. In particular, step 320 may include receiving interaction with the "replace" icon included on a representation of a product record in the second interface as shown in FIGS. 4B and 4C.

In response to determining the interaction at step 320 to have occurred, the item in the electronic cart for which the augmented information interface element was selected at step 314 may be replaced 322 with an identifier of the product record of the shelf for which the representation was selected at step 320. One or more items of an electronic shopping cart as received at steps 302-304 or as modified at step 322 may additionally be selected and replaced according to steps 314-322. An item of a shelf as displayed at step 318 may also be selected as at step 320 and added to the electronic shopping cart (i.e. an identifier thereof) rather than replacing an item already in the electronic shopping cart. An instruction to replace an item with an item from the shelf or to add an item from the shelf may invoke transmitting of a notification from the user device 116, 118 to the server system 102 to replace a selected item with the item selected from the shelf (i.e. add the product identifier thereof to the transaction) and remove the item selected for replacement if replacement is selected.

If no item represented in the first interface is selected for displaying of the shelf thereof, then steps relating to display and interaction with the shelf (316-322) are not performed by the executing computer system or systems. Likewise, if no item of the shelf is selected at step 320, then no opportunity to replace is presented, in some embodiments and no replacing 322 is performed by the executing computer or computer systems.

The electronic shopping cart as received 304 and any modifications performed according to step 322 may then be purchased at step 324. Concluding 324 the transaction for the purchase of the items of the shopping cart may include interaction between the user device and server system 102 in order to transmit the selections from the user device to the server system 102 and process payment therefore according to any method for conducting ecommerce transactions known in the art.

Figure 4A:
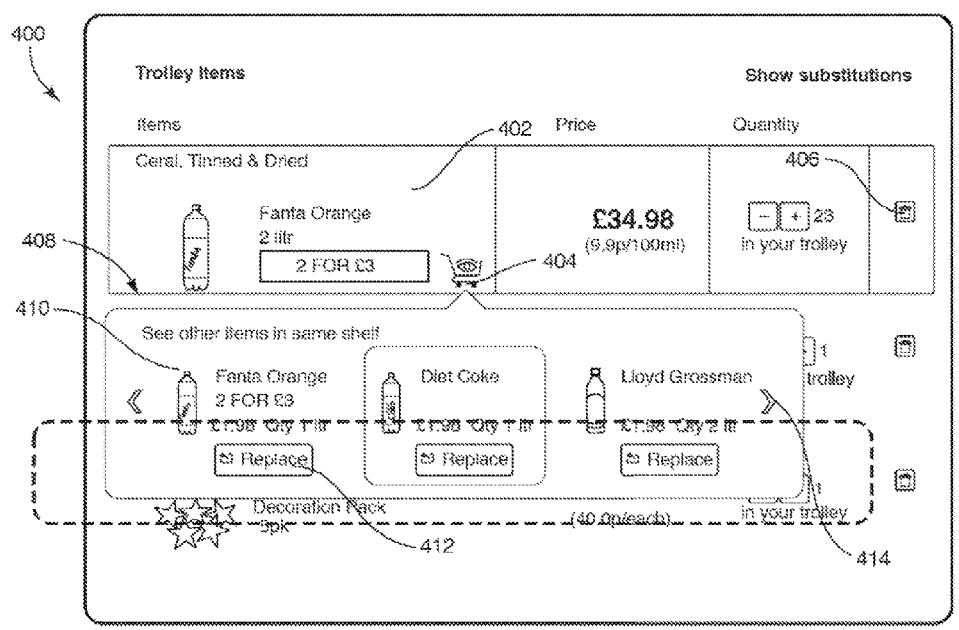
FIGS. 4A through 4C are example interfaces for providing search results in accordance with an embodiment of the present invention.
Figure 4B:
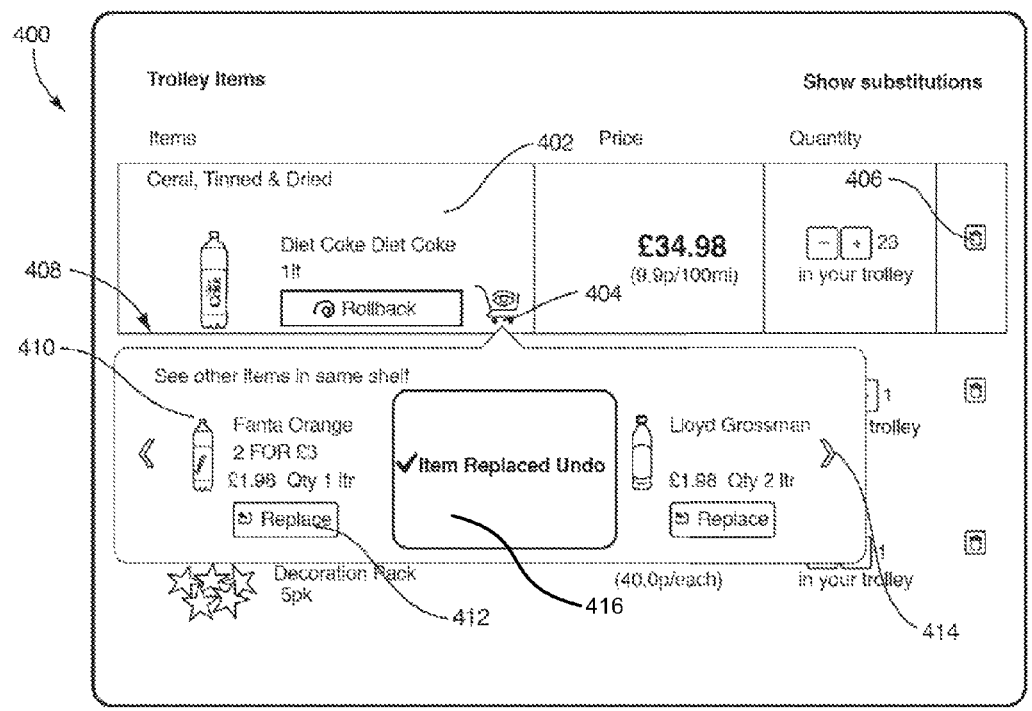
Figure 4C:
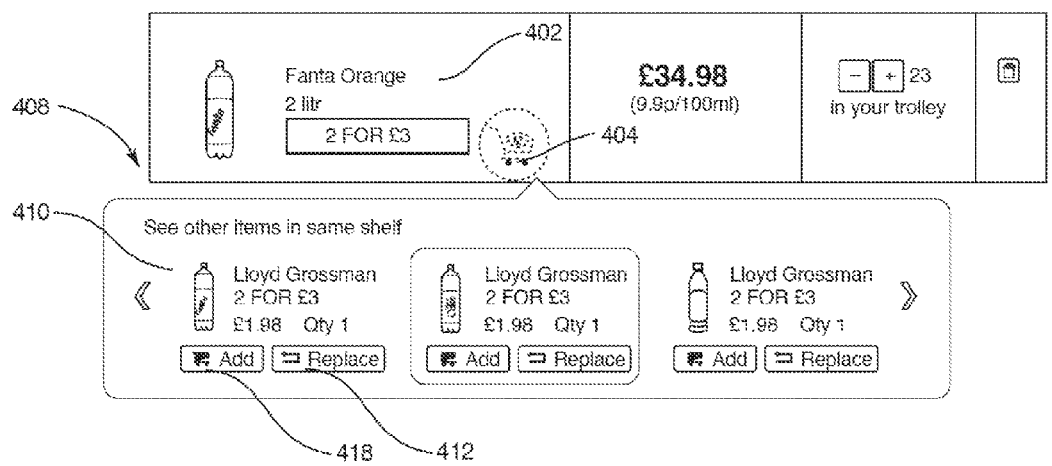

FIG. 4A illustrates an example of the first interface 400 as described above. As shown a plurality of representations 402 of product records are displayed on a user device 116, 118, each corresponding to an item added to an electronic shopping cart as described above. The representations may include data from the product records 106 added to the electronic shopping cart, such as an identifier, image, price, description, discounts, or some other data. The first interface 400 may further include adjacent or on each representation one or more interface elements 404 for invoking actions with respect to the product records corresponding to the representation. For example, the shopping cart with an eye of element 404. Scrolling of the representations 402 in the first direction may be performed in response to detecting swiping of a touch screen, interacting with interface elements invoking scrolling, receiving a keystroke instructing scrolling, or some other manner. In some embodiments, interface element 404 may invoke display of a shelf 114 of a corresponding product record 106 of a representation 402 as described with respect to steps 314-322 above.

Other interface elements and corresponding functionality may be defined by the first interface for each representation 402. For example, the first interface may invoke removal of an item from the shopping list in response to detecting interaction with element 406 associated. For example, the user device 116, 118 may, in response to interaction with element 406, transmit a notification to the server system 102, which then removes the item associated with the selected element 406 from the electronic shopping cart.

In response to selection of element 404, a second interface 408 may be displayed as shown with representations 410 of product records of the shelf 114 of the product record 106 corresponding to the selected element 404. Interface element 412 may be included on the representations 410 of product records of the shelf 114. The interface may invoke replacement of an item corresponding to the representation 402 for which the element 404 was selected as described above. In particular, the representation 402 may be replaced with the selected representation 410 in response to interaction with element 412. An interface element 412 similar to element 404 may be included in each representation 410 to invoke adding of the product corresponding to the each representation 410 to an electronic shopping cart for subsequent purchase as described above. Interface elements 414 may invoke scrolling of the representations 410 in the second direction. As is apparent, the second interface 408 is superimposed on the first interface 400. Alternatively, scrolling of the representations 410 in the second direction may be performed by the device 116, 118 in response to swiping of a touch screen, receiving of a keystroke, or some other input.

Referring to FIG. 4B, following selection of an interface element 412, the first interface may be programmed, or instructed by the server system 102, to update the representations 402 of the product records identified in the electronic shopping cart. In particular, the representations 402 of interface 400 may be updated to include a representation of the product record from the shelf 114 of the product replaced according to interaction with the element 412 as described above. In some embodiments, the representation 412 that was selected for replacement by interaction with the element 406 may be replaced in the interface 408 by an interface element 416. The second interface may define instructions that cause the user device to determine that interface element 416 is selected, and, in response, reverse the replacement. That is to say, notification may be transmitted from the user device 116, 118 to the server system 102 to restore the item replaced in response to selection of the element 406 and remove the item from the corresponding shelf 114 with which it was replaced.

Referring to FIG. 4C, in some embodiments, the second interface may, for each representation 410, display both interface element 412 for invoking replacement and an interface element 418 invoking simple addition of the product represented by the representation 410 to the electronic shopping cart. Specifically, in response to detecting, by the user device 116, 118, interaction with the element 418 of a representation 410, the user device 116, 118 may transmit notification to the server system 102 to add the product represented by the representation 410 to the electronic shopping cart.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A method comprising:
    receiving, by a computer system using one or more processors, from a user device, an addition of one or more items for purchase to an electronic shopping cart, wherein each item of the one or more items corresponds to a first product record comprising product attributes and having a shelf associated therewith, the shelf referencing a plurality of related product records that are related to the first product record, wherein the first product record comprises a first representation of an item of the one or more items for purchase;

receiving, by the computer system from the user device, an instruction to check out to purchase the one or more items in the electronic shopping cart;

in response to the instruction to check out, transmitting, by the computer system to the user device, a first interface comprising a listing of the one or more items for purchase in the electronic shopping cart, the first interface displaying first representations of the one or more items, wherein the first interface scrolls in a vertical direction and comprises an augmented information interface element adjacent to each first representation to enable a user to interact with the each first representation of the one or more items for purchase;

receiving, by the computer system from the user device, a notification of an interaction when the augmented information interface element, corresponding to the first representation of the first representations of the one or more items, is selected; and in response to receiving the notification of the interaction, superimposing a second interface on the first interface in proximity to the first representation, wherein the second interface comprises a list of second representations of second product records referenced in the shelf associated with the first product record corresponding to a first item of the one or more items corresponding to the first representation, as selected, wherein the second interface scrolls in a horizontal direction that is perpendicular to the vertical direction and wherein the second interface does not scroll in the vertical direction, wherein:
the second interface enables the user to compare the first representation with one or more of the second representations displayed on the second interface comprising images, prices, or discounts of the second product records;

the second representations of the second product records correspond to at least items that are alternative brands or related items to the first representation of the first item displayed on the first interface;

the second interface further comprises a first selector associated with one of the second representations of the second product records configured, when selected, to add the one of the second representations to the first representations in the first interface while maintaining the first representation, as selected, in the first interface, wherein the listing of the one or more items for purchase displayed on the first interface is updated to include the second representation when the one of the second representations is added; and the second interface further comprises a second selector on the second interface associated with the one of the second representations of the second product records configured, when selected, to enable the user to replace the first representation in the first interface with the one of the second representations, wherein the listing of the one or more items for purchase displayed on the first interface is updated to replace the first representation with the one of the second representations when the one of the second representations is replaced.

2. The method of claim 1, wherein the first interface includes instructions for:

transmitting a notification to the computer system to remove an item from the electronic shopping cart.

3. The method of claim 2, wherein the first interface includes instructions for:
processing the one or more items in the electronic shopping cart by an e-commerce payment transaction.

4. The method of claim 1, wherein the first interface scrolling in the vertical direction is performed by swiping a touch screen in the vertical direction, and the second interface scrolling in the horizontal direction is performed by swiping a touch screen in the horizontal direction.

5. The method of claim 1, further comprising:
receiving, by the computer system from the user device, a selection of the second selector in the second interface with a selected second representation of the second representations of the shelf further comprising product categories and sub-categories associated with the first representation.

6. The method of claim 1, further comprising:
receiving, by the computer system from the user device, a selection of the first selector in the second interface with a selected second representation of the second representations of the shelf further comprising product categories and sub-categories associated with the first representation.

7. A system comprising one or more processors and one or more memory devices operably coupled to the one or more processors, the one or more memory devices storing computer instructions configured to cause the one or more processors to:

receive, from a user device, an addition of one or more items for purchase to an electronic shopping cart, wherein each item of the one or more items corresponds to a first product record comprising product attributes and having a shelf associated therewith, the shelf referencing a plurality of related product records that are related to the first product record, wherein the first product record comprises a first representation of an item of the one or more items for purchase;

receive, from the user device, an instruction to check out to purchase the one or more items in to the electronic shopping cart;

in response to the instruction to check out, transmit a first interface comprising a listing of the one or more items for purchase in the electronic shopping cart, the first interface displaying first representations of the one or more items, wherein the first interface scrolls in a vertical direction and comprises an augmented information interface element adjacent to each first representation to enable a user to interact with the each first representation of the one or more items for purchase;

receive, from the user device, a notification of an interaction when the augmented information interface element, corresponding to the first representation of the first representations of the one or more items, is selected; and in response to receiving the notification of the interaction, superimposing a second interface on the first interface in proximity to the first representation, wherein the second interface comprises a list of second representations of second product records referenced in the shelf associated with the first product record corresponding to a first item of the one or more items corresponding to the first representation, as selected, wherein the second interface scrolls in a horizontal direction that is perpendicular to the vertical direction and wherein the second interface does not scroll in the vertical direction, wherein:

the second interface enables the user to compare the first representation with one or more of the second representations displayed on the second interface comprising images, prices, or discounts of the second product records;

the second representations of the second product records correspond to at least items that are alternative brands or related items to the first representation of the first item displayed on the first interface;

the second interface further comprises a first selector associated with one of the second representations of the second product records configured, when selected, to add the one of the second representations to the first representations in the first interface while maintaining the first representation, as selected, in the first interface, wherein the listing of the one or more items for purchase displayed on the first interface is updated to include the second representation when the one of the second representations is added; and the second interface further comprises a second selector on the second interface associated with the one of the second representations of the second product records configured, when selected, to enable the user to replace the first representation in the first interface with the one of the second representations, wherein the listing of the one or more items for purchase displayed on the first interface is updated to replace the first representation with the one of the second representations when the one of the second representations is replaced.

8. The system of claim 7, wherein the first interface includes instructions for:

transmitting a notification to the system to remove an item from the electronic shopping cart.

9. The system of claim 8, wherein the first interface includes instructions for:

processing the one or more items in the electronic shopping cart by an e-commerce payment transaction.

10. The system of claim 7, wherein the first interface scrolling in the vertical direction is performed by swiping a touch screen in the vertical direction and the second interface scrolling in the horizontal direction is performed by swiping a touch screen in the horizontal direction.

11. The system of claim 7, wherein the computer instructions are further configured to cause the one or more processors to:

receive a selection of the second selector in the second interface with a selected second representation of the second representations of the shelf further comprising product categories and sub-categories associated with the first representation.

12. The system of claim 7, wherein the computer instructions are further configured to cause the one or more processors to:

receive a selection of the first selector in the second interface with a selected second representation of the second representations of the shelf further comprising product categories and sub-categories associated with the first representation.

13. A non-transitory computer readable storage medium storing one or more programs configured for execution by an electronic device, the one or more programs comprising instructions for:

receiving, by a user device, an addition of one or more items for purchase to an electronic shopping cart, wherein each item of the one or more items corresponds to a first product record comprising product attributes and having a shelf associated therewith, the shelf referencing a plurality of related product records that are related to the first product record, wherein the first product record comprises a first representation of an item of the one or more items for purchase;

transmitting, by the user device, the one or more items to a server system;

receiving, on the user device, an instruction to check out to purchase the one or more items in the electronic shopping cart;

in response to the instruction to check out transmitting, to the user device, a first interface comprising a listing of the one or more items for purchase in the electronic shopping cart, the first interface displaying first representations of the one or more items, wherein the first interface scrolls in a vertical direction and comprises an augmented information interface element adjacent to each first representation to enable a user to interact with the each first representation of the one or more items for purchase;

receiving by the user device, a notification of an interaction when the augmented information interface element, corresponding to the first representation of the first representations of the one or more items, is selected; and in response to receiving the notification of the interaction, superimposing a second interface on the first interface in proximity to the first representation, wherein the second interface comprises a list of second representations of second product records referenced in the shelf associated with the first product record corresponding to a first item of the one or more items corresponding to the first representation, as selected, wherein the second interface scrolls in a horizontal direction that is perpendicular to the vertical direction and wherein the second interface does no scroll in the vertical direction, wherein:

the second interface enables the user to compare the first representation with one or more of the second representations displayed on the second interface comprising images, prices, or discounts of the second product records;

the second representations of the second product records correspond to at least items that are alternative brands or related items to the first representation of the first item displayed on the first interface;

the second interface further comprises a first selector associated with one of the second representations of the second product records configured, when selected, to add the one of the second representations to the first representations in the first interface while maintaining the first representation, as selected, in the first interface, wherein the listing of the one or more items for purchase displayed on the first interface is updated to include the second representation when the one of the second representations is added; and the second interface further comprises a second selector on the second interface associated with the one of the second representations of the second product records configured, when selected, enabling the user to replace the first representation in the first interface with the one of the second representations, wherein the listing of the one or more items for purchase displayed on the first interface is updated to replace the first representation with the one of the second representations when the one of the second representations is replaced.

14. The non-transitory computer readable storage medium of claim 13, wherein the first interface includes instructions for:

transmitting a notification to the server system to remove an item from the electronic shopping cart.

15. The non-transitory computer readable storage medium of claim 14, wherein the first interface includes instructions for:

processing the one or more items in the electronic shopping cart by an e-commerce payment transaction.

16. The non-transitory computer readable storage medium of claim 15, wherein the first interface scrolling in the vertical direction is performed by swiping a touch screen in the vertical direction and the second interface scrolling in the horizontal direction is performed by swiping a touch screen in the horizontal direction.

17. The non-transitory computer readable storage medium of claim 13, wherein the shelf associated with the first product record for the each item of the one or more items further comprises product categories and sub-categories associated with the first representation.

18. The non-transitory computer readable storage medium of claim 13, further comprising:

transmitting, by the user device the server system, a selection of the second selector in the second interface with a selected second representation of the second representations, such that the server system, in response to receiving the selection of the second selector in the second interface with the selected second representation, replaces the first item in the electronic shopping cart corresponding to the selected first representation with a reference to the second product record corresponding to a second item of the one or more items corresponding to the selected second representation.

19. The non-transitory computer readable storage medium of claim 13, further comprising:

transmitting, by the user device the server system, a selection of the first selector in the second interface with a selected second representation of the second representations, such that the server system, in response to receiving the selection of the first selector in the second interface with the selected second representation, adds a reference to the second product record corresponding to a second item of the one or more items corresponding to the selected second representation to the electronic shopping cart while maintaining the first item in the electronic shopping cart corresponding to the selected first representation.

20. The method of claim 1, wherein the shelf associated with the first product record for the each item of the one or more items of the first interface includes references to product records corresponding to items that are alternative brands or related items to the each item of the one of the one or more items associated with the first representation.

* * * * *